US012019586B2

(12) United States Patent
Fujii et al.

(10) Patent No.: US 12,019,586 B2
(45) Date of Patent: Jun. 25, 2024

(54) COMPUTER READABLE MEDIUM STORING FILE GENEALOGY IDENTIFICATION PROGRAM, AND FILE GENEALOGY IDENTIFICATION SYSTEM

(71) Applicant: BoostDraft, Inc., Tokyo (JP)

(72) Inventors: Yohei Fujii, Tokyo (JP); Hiroshi Watanabe, Tokyo (JP); Takahisa Mizuno, Tokyo (JP)

(73) Assignee: BOOSTDRAFT, INC., Tokyo (JP)

( * ) Notice: Subject to any disclaimer, the term of this patent is extended or adjusted under 35 U.S.C. 154(b) by 0 days.

(21) Appl. No.: 18/075,014

(22) Filed: Dec. 5, 2022

(65) Prior Publication Data

US 2023/0325350 A1 Oct. 12, 2023

(30) Foreign Application Priority Data

Apr. 11, 2022 (JP) ................................ 2022-065053

(51) Int. Cl.
*G06F 16/14* (2019.01)
*G06F 16/13* (2019.01)
(Continued)

(52) U.S. Cl.
CPC ............ *G06F 16/148* (2019.01); *G06F 16/13* (2019.01); *G06F 16/162* (2019.01); *G06F 16/185* (2019.01)

(58) Field of Classification Search
CPC ...... G06F 16/148; G06F 16/13; G06F 16/162; G06F 16/185; G06F 16/156; G06F 16/14; G06F 16/17; G06F 16/906
See application file for complete search history.

(56) References Cited

U.S. PATENT DOCUMENTS

| 2009/0125472 A1* | 5/2009 | Houchi | G06F 16/93 |
| | | | 706/50 |
| 2019/0042558 A1* | 2/2019 | Glover | G06F 8/71 |

FOREIGN PATENT DOCUMENTS

| JP | H11-327980 A | 11/1999 |
| JP | 2005-316815 A | 11/2005 |
| JP | 2008-181350 A | 8/2008 |

OTHER PUBLICATIONS

Office Action with a drafting date of Jun. 10, 2022 issued in the counterpart Japanese Patent Application No. 2022-065053 with the English translation thereof.

* cited by examiner

*Primary Examiner* — Mark D Featherstone
*Assistant Examiner* — Kweku William Halm
(74) *Attorney, Agent, or Firm* — GREENBLUM & BERNSTEIN, P.L.C.

(57) ABSTRACT

A non-transitory computer readable medium with a file genealogy identification program configured to cause a computer to perform: receiving a plurality of document files each having been added to with a unique identifier each time the document file has been saved by an application program and having a set of identifiers based on the added identifiers; determining a genealogical relationship between first and second document files in the plurality of document files based on a similarity calculated by obtaining an intersection based on comparison of a first set of identifiers collected from the first document file to a second set of identifiers collected from the second document file, obtaining a union of the first set of identifiers and the second set of identifiers, and calculating the similarity based on the number of unique identifiers in the intersection and the number of unique identifiers in the union.

16 Claims, 8 Drawing Sheets

(51) Int. Cl.
*G06F 16/16* (2019.01)
*G06F 16/185* (2019.01)

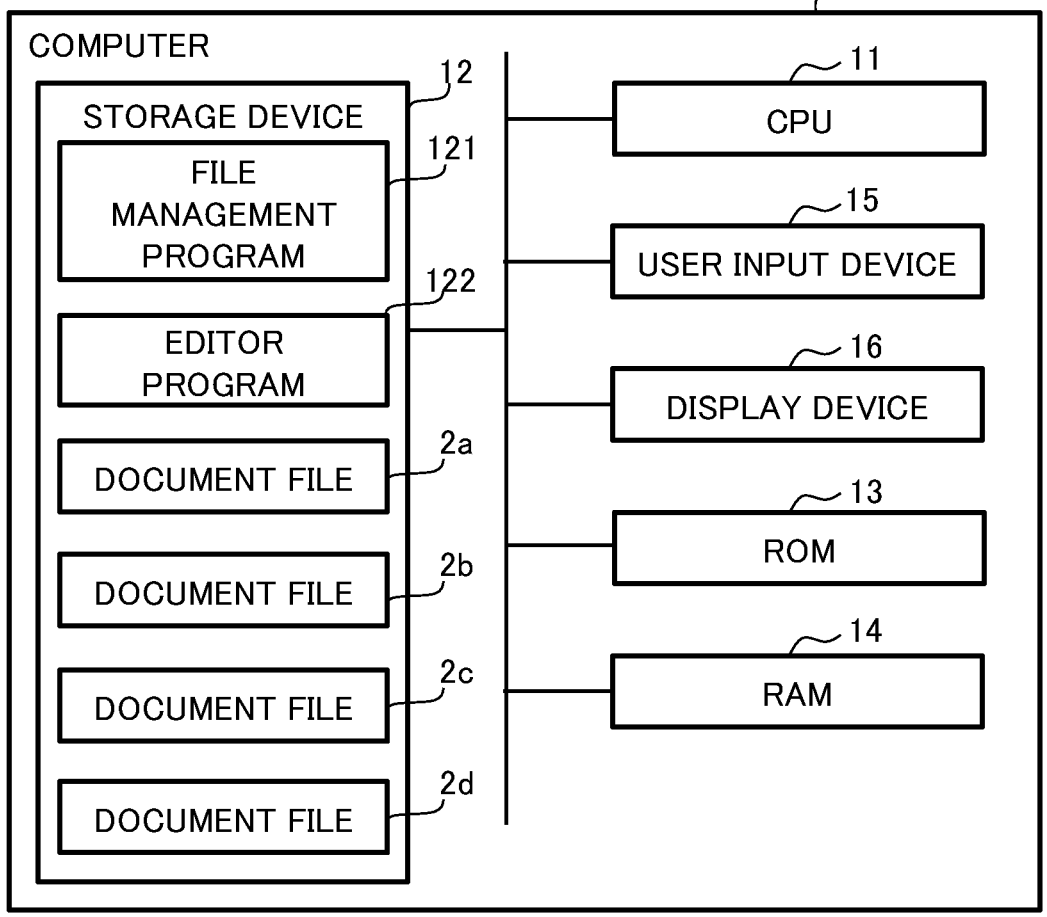
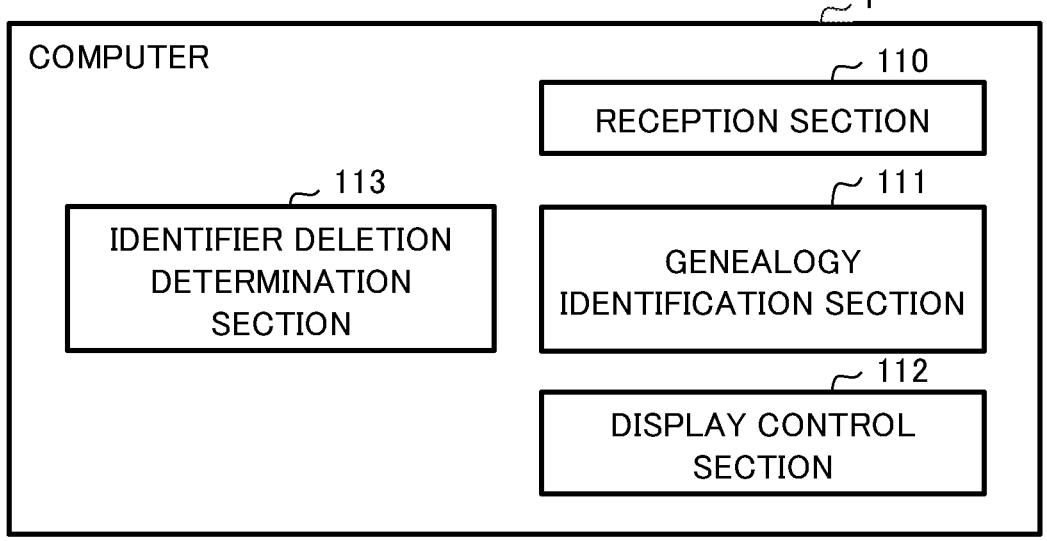

FIG. 5

```
. . .
<w:p w:rsidR= "00896DB0"  w:rsidRPr= "00484939"
w:rsidRDefault= "00CB2E8F"   w:rsidP="00273748">
. . .
<w:rsids>
  <w:rsidRoot w:val="00464813"/>
  <w:rsid w:val="00464813" />
</w:rsids>
. . .
```
2c

FIG. 6

```
. . .
<styles>
  ...
  <w:rsid w:val="00455AAB" />
  ...
</styles>
. . .
```
2c

FIG. 7

```
. . .
<w:ins w:id="308" w:author="Takhisa Mizuno"
w:date="2021-06-29T19:44:00Z"/>
. . .
```
2c

COMPUTER READABLE MEDIUM STORING FILE GENEALOGY IDENTIFICATION PROGRAM, AND FILE GENEALOGY IDENTIFICATION SYSTEM

CROSS REFERENCE TO RELATED APPLICATIONS

This application claims the benefit of Japanese Patent Application No. 2022-065053 filed on Apr. 11, 2022, the disclosure of which is incorporated herein by reference.

BACKGROUND

Technical Field

The present invention relates to a computer readable medium storing a file genealogy identification program, and to a file genealogy identification system.

Related Art

It is often that a file stored in a computer storage device is saved under new name after their contents are edited, added and/or deleted. Users may, for example, append the save date and time at the end of a saved file name to indicate the genealogy from the original file to the initially saved file. However, this file name does not indicate a true genealogical relationship.

Japanese Laid-Open Patent Application, Publication No. H11-327980 (hereinafter referred to as Patent Document 1) discloses an invention that manages genealogical relationships among versions of resources with different implications called continuation and branching.

SUMMARY

The invention disclosed in Patent Document 1 assumes that version information of resource is present. Patent Document 1 does not address how the genealogical relationship between files to be managed when explicit version information is not given to the files.

In view of the above, the present invention has been made in an attempt to identify a plurality of document files having genealogical relationships and to determine genealogical relationships among document files easily.

A first aspect of the present invention is a non-transitory computer readable medium with a file genealogy identification program configured to cause at least one computer to perform steps including: receiving a plurality of document files each of which has been added to with a unique identifier each time the document file has been saved by an application program and has a set of identifiers based on the added identifiers; obtaining an intersection based on comparison of a first set of identifiers collected from the set of identifiers of a first document file in the plurality of document files to a second set of identifiers collected from the set of identifiers of a second document file in the plurality of document files; obtaining a union of the first set of identifiers and the second set of identifiers; calculating a similarity based on a number of unique identifiers in the intersection and a number of unique identifiers in the union; and determining whether the first document file and the second document file have a genealogical relationship therebetween based on the similarity.

A second aspect of the present invention is a non-transitory computer readable medium with a file genealogy identification program configured to cause at least one computer to perform steps including: receiving a plurality of document files each of which has been added to with a unique identifier each time the document file has been saved by an application program and has a set of identifiers based on the added identifiers; obtaining an intersection based on comparison of a first set of identifiers collected from the set of identifiers of a first document file in the plurality of document files to a second set of identifiers collected from the set of identifiers of a second document file in of the plurality of document files; obtaining a union of the first set of identifiers and the second set of identifiers; calculating a first similarity based on a number of unique identifiers in the intersection and a number of unique identifiers in the union; calculating a second similarity between a content string of the first document file and a content string of the second document file; and determining whether the first document file and the second document file have a genealogical relationship therebetween based on the first similarity and the second similarity.

A third aspect of the present invention is a non-transitory computer readable medium with a file genealogy identification program configured to cause at least one computer to perform steps including: receiving a plurality of document files, wherein each document file of the plurality of document files has a structure such that the document file has been added to with a unique identifier each time the document file has been saved by an application program and has a set of identifiers based on the added identifiers and such that one or more identifiers in the set of identifiers may have been deleted after it had been previously added to the document file; determining whether one of the identifiers in the sets of identifiers previously added to the plurality of document files has been deleted; when deletion of an identifier in the sets of identifiers of the plurality of document files is not detected, determining which document file, of the plurality of document files, has been derived from which other document file, of the plurality of document files, based on inclusion relationships among the sets of identifiers of the plurality of document files; when deletion of an identifier in the sets of identifiers of the plurality of document files is detected, identifying, from the plurality of document files, a plurality of document files having genealogical relationships, based on similarities among the sets of identifiers of the plurality of document files; and identifying parent-child relationships among the plurality of document files having genealogical relationships.

A fourth aspect of the present invention is a file genealogy identification system implemented using at least one computer including one or more hardware processors, the file genealogy identification system including: a reception section, implemented using at least one of the one or more hardware processors, configured to receive a plurality of document files, wherein each of the plurality of documents files has a structure such that the document file has been added to with a unique identifier each time the document file has been saved by an application program and has a set of identifiers based on the added identifiers and such that one or more identifiers in the set of identifiers may have been deleted after it had been previously added to the document file; an identifier deletion determination section, implemented using at least one of the one or more hardware processors, configured to determine whether an identifier in the sets of identifiers of the plurality of document files has been deleted; and an identification section, implemented using at least one of the one or more hardware processors, configured to, when deletion of an identifier in the sets of identifiers of the plurality of document files is detected, identify, from the plurality of document files, a plurality of document files having genealogical relationships, based on similarities among the sets of identifiers of the plurality of document files, when deletion of an identifier in the sets of identifiers of the plurality of document files is not detected, determine which document file, of the plurality of document files, has been derived from which other document file, of the plurality of document files, based on inclusion relationships among the sets of identifiers of the plurality of document files, and identify parent-child relationships among the plurality of document files having genealogical relationships.

A fifth aspect of the present invention is a file genealogy identification system implemented using at least one computer including one or more hardware processors, the file genealogy identification system including: a reception section, implemented using at least one of the one or more hardware processors, configured to receive a plurality of document files each of which has been added to with a unique identifier each time the document file has been saved by an application program and has a set of identifiers based on the added identifiers; and an identification section, implemented using at least one of the one or more hardware processors, configured to obtain an intersection based on comparison of a first set of identifiers collected from the set of identifiers of a first document file in the plurality of document files to a second set of identifiers collected from the set of identifiers of a second document file in the plurality of document files, obtain a union of the first set of identifiers and the second set of identifiers, calculate a similarity based on a number of unique identifiers in the intersection and a number of unique identifiers in the union, and determine whether the first document file and the second document file have a genealogical relationship therebetween based on the similarity.

A sixth aspect of the present invention is a file genealogy identification system implemented using at least one computer including one or more hardware processors, the file genealogy identification system including: a reception section, implemented using at least one of the one or more hardware processors, configured to receive a plurality of document files each of which has been added to with a unique identifier each time the document file has been saved by an application program and has a set of identifiers based on the added identifiers; and an identification section, implemented using at least one of the one or more hardware processors, configured to obtain an intersection based on comparison of a first set of identifiers collected from the set of identifiers of a first document file in the plurality of document files to a second set of identifiers collected from the set of identifiers of a second document file in the plurality of document files, obtain a union of the first set of identifiers and the second set of identifiers, calculate a first similarity based on a number of unique identifiers in the intersection and a number of unique identifiers in the union, calculate a second similarity between a content string of the first document file and a content string of the second document file, and determine whether the first document file and the second document file have a genealogical relationship therebetween based on the first similarity and the second similarity.

The present invention makes it possible to identify a plurality of document files having genealogical relationships and to determine genealogical relationships among document files easily.

BRIEF DESCRIPTION OF THE DRAWINGS

FIG. 1 is a diagram for explaining major components of a computer according to a present embodiment.

FIG. 2 is a functional block diagram of the computer of the present embodiment.

FIG. 5 illustrates a case where although a w:rsids tag element is present, one or more identifiers in the set of identifiers have been deleted.

FIG. 6 illustrates a styles tag element of a document file.

FIG. 7 illustrates a revision history in a document file.

DETAILED DESCRIPTION OF THE EMBODIMENTS

Figure 3:
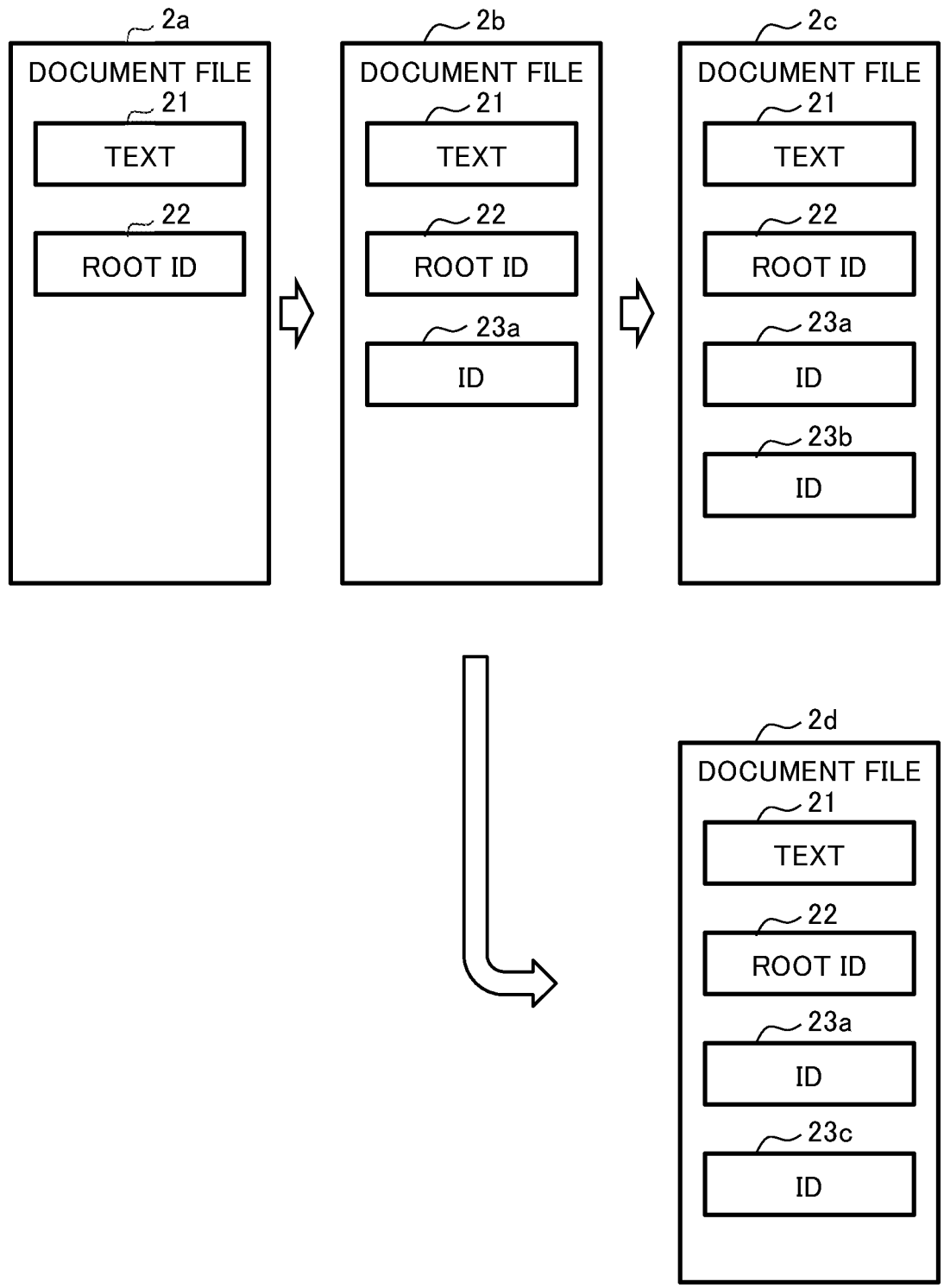
FIG. 3 illustrates an example of genealogical relationships of document files each storing a set of identifiers.

Hereinafter, modes for carrying out the present invention is described in detail with reference to the drawings.

Note that, regarding the term "genealogical relationship" used in this application, when it is used as in "determine genealogical relationships among files", it not only covers determining direct ancestor-descendant relationships of the files, which are identifiable based on inclusion relationships among the files, but also covers determining a tree relationship including parent-child relationships and sibling relationships of the files, i.e., whether the files are in the same tree.

Note that, regarding the term "derive" used in this application, when it is used as in "file B has been derived from file A", it means that file B has been prepared using file A or portion(s) of file A.

Note that, regarding the term "intersection" used in this application, when it is used as in "intersection of sets A and B" and "intersection based on comparison of set A to set B", it means the set containing all element(s) of set A that also belong to set B or equivalently, all element(s) of set B that also belong to set A.

FIG. 1 is a diagram for explaining major components of a Computer 1 of an embodiment according to the present invention.

Computer 1, for example, a personal computer that functions as a document drafting support device (word processor) or a document browsing device. Here, the document browsing device provides a document drafting support function (word processing software) similar to that of the document drafting support device. Note that in the following description, the same components are given the same reference numeral and descriptions thereof are omitted as appropriate.

Computer 1 includes a central processing unit (CPU) 11, a Storage Device 12, a Read Only Memory (ROM) 13, a Random Access Memory (RAM) 14, a User Input Device 15, and a Display Device 16.

CPU 11 executes a File Management Program 121 and a Editor Program 122, stored in Storage Device 12.

Editor Program 122 is an application program that causes CPU 11 of Computer 1 to create and edit a document file. Examples of such an application program include Microsoft WORD. Document Files 2a to 2d are files created using Editor Program 122.

File Management Program 121 causes CPU 11 of Computer 1 to determine genealogical relationships among document files, and to manage the document files.

CPU 11 executes File Management Program 121 to embody a Reception Section 110, a Genealogy Identification Section 111, a Display Control Section 112, and an Identifier Deletion Determination Section 113, illustrated in FIG. 2. The functional sections embodied by CPU 11 are described below in detail with reference to FIG. 2.

Storage Device 12 is a large-capacity storage device, non-limiting examples of which include hard disk drives and non-volatile memories. Storage Device 12 stores, as an example, File Management Program 121 and Editor Program 122.

RAM 14 serves as a work area for temporarily storing various programs that can be executed by CPU 11, input data, output data, and parameters.

User Input Device 15 includes a keyboard having character keys, cursor keys, numeric keys, and function keys and a pointing device such as a mouse. User Input Device 15 outputs operation signals representing key events of keyboard keys pressed and operation signals representing mouse events of the mouse operated to CPU 11 as input signals. CPU 11 performs processing based on the operation signals from User Input Device 15.

Display Device 16 includes a monitor display such as a liquid crystal display (LCD). Display Device 16 displays various screens according to display commands input from CPU 11. Display Device 16 and User Input Device 15 may be constructed to share a touch panel display.

FIG. 2 is a functional block diagram of Computer 1 of the present embodiment.

Computer 1 embodies Reception Section 110, Genealogy Identification Section 111, Display Control Section 112, and Identifier Deletion Determination Section 113.

Reception Section 110 receives one or more Document Files 2a to 2d and the like. Document Files 2a to 2d are created by Editor Program 122 and are structured such that each document file is added to with a unique identifier every time the document file is saved.

Genealogy Identification Section 111 identifies a plurality of document files having genealogical relationships based on the inclusion relationships or similarities among sets of the identifiers included in the document files. Genealogy Identification Section 111 further identifies parent-child relationships of a plurality of document files having genealogical relationships, based on either the inclusion relationships among the sets of identifiers of files having genealogical relationships, the revision histories of the files, the information on the date and time when the files are added to the operating system installed on Computer 1, or the names of the files.

Display Control Section 112 acquires a set of identifiers consisting of a plurality of identifiers of a document file and a root identifier of the document file, narrows down the document files by screening them according to the root identifier, and display the narrowed-down document files on Display Device 16 in the format of a file tree.

Identifier Deletion Determination Section 113 determines whether one or more identifiers of the set of identifiers have been deleted. Note that any of the identifiers and root identifier of a document file may have been deleted by a certain application program. In view of this, Identifier Deletion Determination Section 113 is configured to determine whether any of the identifiers and the root identifier have been deleted.

FIG. 3 illustrates an example of genealogical relationships of Document Files 2a to 2d each storing a set of identifiers.

Document Files 2a to 2d each store a Root Identifier 22 and an Identifier 23a and the like, in addition to Text 21. The arrows in the drawing represent genealogical relationships of the document files.

Document File 2a has been created at the earliest among the document files. Document File 2b has been derived first from Document File 2a. The set of identifiers of Document File 2b includes the set of identifiers included in Document File 2a.

Document Files 2c and 2d each have been derived from Document File 2b. That means, Document Files 2c and 2d each have been derived via Document File 2b from Document File 2a. Document Files 2c and 2d each have a set of identifies that includes the set of identifiers included in Document File 2b and thus the set of identifiers included in Document File 2a.

Document File 2a stores a Root Identifier 22 but no identifiers. Document File 2b stores Root Identifier 22 and an Identifier 23a. Document File 2c stores Root Identifier 22 and Identifier 23a and an Identifier 23b. Document File 2d stores Root Identifier 22 and Identifier 23a and an Identifier 23c.

Figure 4:
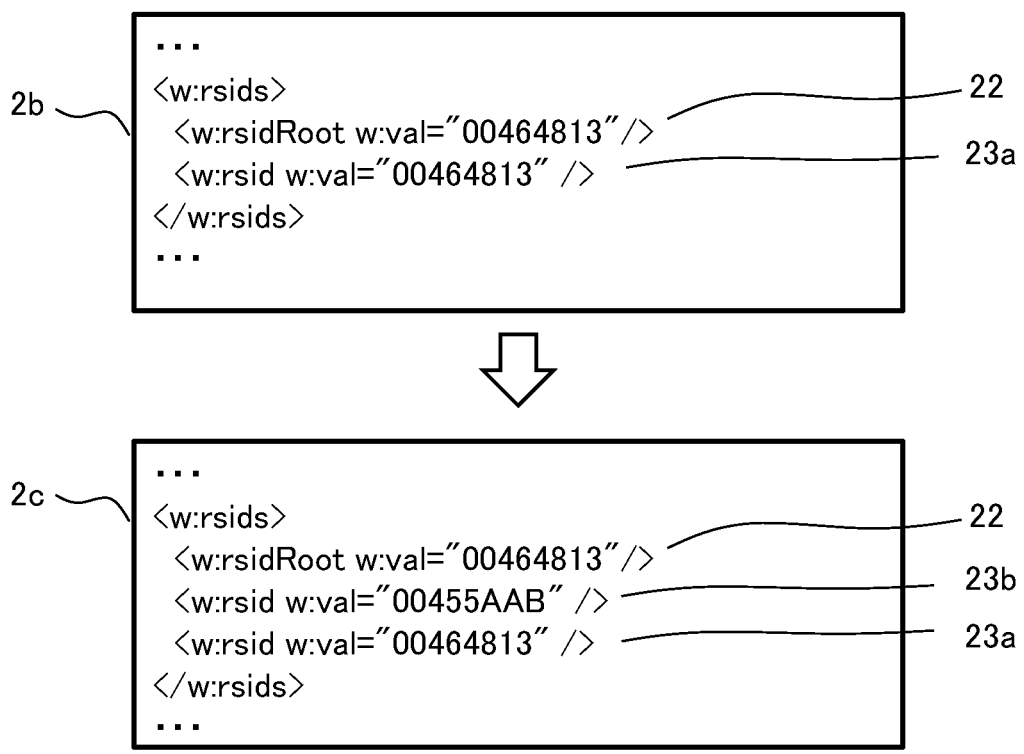
FIG. 4 illustrates sets of identifiers each stored in a document file.

FIG. 4 illustrates Document Files 2b and 2c each with a set of identifiers stored therein.

Document Files 2b and 2c are, for example, each a WORD file in the form of eXtended Markup Language (XML). In this case, a w:rsids tag element contains Root Identifier 22 and Identifier 23a, each specified with a w:val attribute. Document Files are not limited to a Word file in the form of XML, but it can include any form of documents that use XML such as EXCEL file and Power Point file.

Document File 2b includes a w:rsids tag element that contains a w:rsidRoot tag element specifying Root Identifier 22 and contains a w:rsid tag element specifying the identifier. Root Identifier 22 has a value of "00464813" specified with the w:val attribute. Identifier 23a has a value of "00464813" specified with the w:val attribute.

Document File 2c includes a w:rsids tag element that contains a w:rsidRoot tag element specifying Root Identifier 22 and contains w:rsid tag elements specifying identifiers. Here, Root Identifier 22 has a value of "00464813" specified with the w:val attribute. Identifier 23a has a value of "00464813" specified with the w:val attribute.

Hereinbelow, a description is given of a method for determining whether one or more members of the set of identifiers of Document File 2c have been deleted therefrom.

When the w:rsids tag element has been deleted from a document file, Identifier Deletion Determination Section 113 determines that the identifiers of this document file have been deleted therefrom.

Genealogy Identification Section 111 identifies a plurality of document files having genealogical relationships, based on the inclusion relationships or similarities of the respective sets of identifiers of the document files. For example, when Genealogy Identification Section 111 determines that the set of identifiers included in Document File 2a is included in or similar to the set of identifiers included in Document File 2b, Genealogy Identification Section 111 determines that Document Files 2a and 2b have a genealogical relationship.

Genealogy Identification Section 111 also determines that Document File 2*a* is a parent file of Document File 2*b*.

FIG. 5 illustrates a case where, although a w:rsids tag element is present, some identifiers have been deleted.

The 2nd line in FIG. 5 represents that a w:p tag element, one of the tag elements to be present in the document, contains a w:rsidR attribute, a w:rsidRPr attribute, a w:rsidRDefault attribute, and a w:rsidP attribute, with each of which information on an identifier is specified. The w:rsidP attribute, w:rsidR attribute, w:rsidRPr attribute, w:rsidRDefault attribute, and the like are each called an identifier retaining attribute.

Note that, in some cases, the information on an identifier is not specified with an attribute of a tag element included in the document but with a tag element itself. Moreover, the tag element may be a tag element other than w:p.

Identifier Deletion Determination Section 113 collects identifiers by parsing the identifier retaining attributes of the tag elements present in the document, and when an identifier in the set of collected identifiers is not present in the w:rsid tag elements contained in the w:rsids tag element, determines that the identifier has been deleted. For example, when identifier 00455AAB stored in the w:rsidRPr attribute in the w:p tag element of the document body is not present in the w:rsids tag element, Identifier Deletion Determination Section 113 determines that identifier "00455AAB" has been deleted.

For the purpose of acceleration of the processing, it is conceivable to, instead of checking whether all the identifiers are specified in the w:rsids tag element, take only the identifiers present in a certain tag element, e.g., a style tag element into account. Identifier Deletion Determination Section 113 may be thus configured to determine that certain identifier(s) have been deleted, when an identifier in the style tag element is not present in the w:rsids tag element.

In calculating similarity, Genealogy Identification Section 111 uses a single or multiple similarity calculation methods.

Hereinafter, a description is given of a first similarity based on sets of identifiers.

Genealogy Identification Section 111 first extracts sets of identifiers. As described, there are cases where one or more of the identifiers have been deleted. To prevent excessive variation of the similarity in such a case, Genealogy Identification Section 111 collects identifiers from tag elements other than the rsids tag element in the document file. Specifically, Genealogy Identification Section 111 collects identifier-related information, such as rsid attributes and/or rsidP attributes of the tag elements in the document. Genealogy Identification Section 111 may be configured to exclude unnecessary identifiers for some cases. For example, an identifier that is known to appear only when a new document is saved appears in a particular tag element. In view of this, Genealogy Identification Section 111 may be configured to exclude such an identifier from those to be collected. In addition, some identifiers appearing in the styles tag and the like rarely vary due to a modification of the document. Genealogy Identification Section 111 may be configured to exclude such identifiers, which are considered to be irrelevant to the calculation of the similarity, from those to be collected.

Next, Genealogy Identification Section 111 uses the collected set of identifiers of a Document File A and the collected set of identifiers of a Document File B to calculate a similarity. Specifically, Genealogy Identification Section 111 calculates the similarity by dividing the number of the unique identifiers in the intersection of the sets of identifiers of Document Files A and B by the number of the unique identifiers in the union of the sets of identifiers of Document Files A and B.

For example, when the number of the unique identifiers that appear in both Document Files A and B is 3 and the number of the unique identifiers that appear at least once in either or both of Document Files A and B is 10, Genealogy Identification Section 111 calculates the similarity as 3÷10=0.3. The calculation of the similarity by Genealogy Identification Section 111 is not limited to this, but it can be any calculation that uses both the union and the intersection.

Hereinafter, a description is given of a second similarity based on demarcated words.

Microsoft WORD represents the text in a document file in a manner of dividing the text as described below. For example, assume that the text of Document File A is like as follows: <w:t>Today's</w:t><w:t>weather</w:t><w:t>is</w:t><w:t>sunny</w:t>

Assume that the text of Document File B, resulted in editing the text of Document File A, is as follows: <w:t>Today's</w:t><w:t>weather</w:t><w:t>seems</w:t><w:t> to</w:t><w:t>be </w:t><w:t>sunny</w:t><w:t>

Strings C of Document File A is [Today's, weather, is, sunny]. Strings D of Document File B is [Today's, weather, seems, to, be, sunny].

Genealogy Identification Section 111 aligns Strings C and D so as to maximize a score calculated by adding 1 when a word in Strings C coincides a corresponding word in Strings D and subtracting 1 otherwise. This is an algorithm equivalent to a known alignment method of DeoxyriboNucleic Acid (DNA).

In the case of Strings C and D, the words of "Today's", "weather", and "sunny" coincide. The word "is" of Strings C fails to coincide with the words of "seems", "to", and "be" of Strings D. In order to maximize the score, Strings C is aligned and become ["Today's", "weather", "is", " ", " ", "sunny"], and the Strings D stays ['Today's", "weather", "seems", "to", "be", "sunny"]. Score will be added by 1 where strings from C and D match, and will be subtracted by 1 where strings from C and D don't match. In this case, as a result, Genealogy Identification Section 111 calculates the second similarity as 0. It should be noted that Genealogy Identification Section 111 is not limited to this calculation method. Genealogy Identification Section 111 may adopt a certain method of scoring coincidence and non-coincidence to obtain a maximum score for an appropriate alignment as the similarity.

Genealogy Identification Section 111 may be configured to adopt either the first similarity or the second similarity alone as the final similarity, or may be configured to combine the first similarity and the second similarity to obtain a similarity that best matches to the actual state.

Note that when the identifiers represent numerical values whose magnitudes are of interest, such as time information or the number of savings, rather than random character strings, Genealogy Identification Section 111 may be configured to calculate a value representing a similarity based on a cosine similarity, a Euclidean distance, a Pearson product-moment correlation coefficient, a Jaccard coefficient, or the like. That is, the similarity is not required to be based on a coincidence degree derived by a general set calculation.

In addition to calculating the similarity, the Genealogy Identification Section 111 also estimates a parent-child relationship.

There is a case where, when tag information related to an identifier have been deleted, the time and date of a document revision has been likewise deleted. In that case, it could be difficult to determine which one of two documents is the parent of the other in a tree only on the basis of the similarity. Since it is difficult to determine which one is the parent in the tree by similarity alone, Genealogy Identification Section 111 determines the parent-child relationship by the modified date and time described in the file, the file name, and the date and time attribute of the file added by the system, in this order.

FIG. 7 illustrates a revision history included in the file.

The w:ins tag element is given of a w:date attribute, by which the file revision date and time has been recorded. The w:ins tag element represents a revision history. When w:ins tag elements remain, the final revision date and time is determined according to the latest revision history.

When no revision history remains and when the date and time when the file is added to the operating system is trustworthy, that date and time is used as the final revision date and time. Here the case the date and time when the file is added to the system is trustworthy is a case when the file is added realtime to the operating system. One example of the trustworthy case is a case where a document file in the computer is constantly monitored, and when the file is saved, the file save date and time of the file is saved in the operating system.

An example of non-trustworthy case is a case where files are added to the computer and after a certain time of period elapses, the files are collectively saved to the operating system. In this case, as the files are collectively saved to the operating system, almost all the files will have the same save date and time.

The file names also could be used to estimate the parent-child relationship. As files are often named using the date and time when the file has been edited, the parent-child relationship may be estimated focusing on a numeric character string (e.g., four-digit numeric characters) located at the beginning or ending of the file name. For example, in the case of a file name of "contract_0501.docx", the file may be estimated as having been edited on May 1st; and in the case of a file name of "contract_0510.docx", the file may be estimated as having been edited on May 10th. The parent-child relationship may be estimated based on these estimations. The parent-child relationships in a file tree may be created based on the estimated information. It is possible to appropriately estimate the parent-child relationships among the files by performing the above determination in order.

Note that Identifier Deletion Determination Section 113 is an optional functional element. For example, in a case where identifiers are guaranteed not to be deleted, the system may be configured without including Identifier Deletion Determination Section 113.

Figure 8:
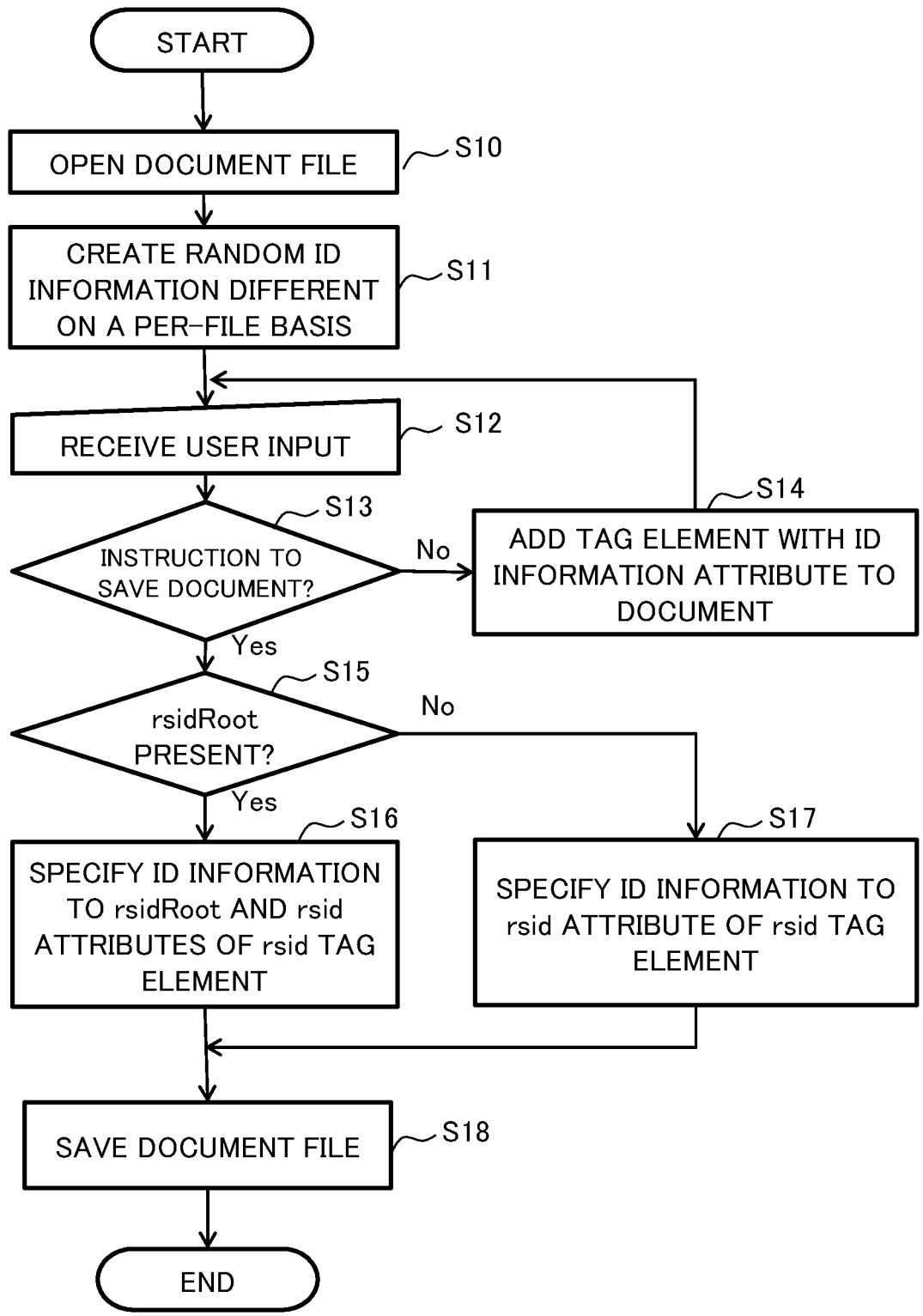
FIG. 8 is a flowchart of saving processing by a document file editing program.

FIG. 8 is a flowchart of the saving processing by Editor Program 122 (e.g., Microsoft WORD).

When Editor Program 122 is executed, CPU 11 opens (step S10) an existing document file or a new document and creates (step S11) a random and unique identifier.

Thereafter, CPU 11 receives (step S12) a user input and determines (step S13) whether saving the document is instructed. Note that the instructions of saving the document includes, in addition to instruction by manual operations, automatic saving by Editor Program 122 itself.

When the input instruction is other than saving the document (No), CPU 11 gives (step S14) to the document a tag element, and sets an identifier to an attribute of the tag, and returns to step S12. In step S13, when the instruction of the user input is to save the document (Yes), CPU 11 proceeds to step S15.

CPU 11 determines (step S15) whether an rsidRoot, which is a root identifier, is present. The case where an rsidRoot is not present correspond to: a state where a new document is saved; and a state where the rsidRoot has been deleted. The root identifier may have been deleted by some application program. In view of this, the flow takes into account the case where the root identifier has been deleted.

In step S15, when an rsidRoot, which is the root identifier, is present (Yes), CPU 11 specifies (step S16) identifier information to an rsidRoot attribute and an rsid attribute of an rsid tag element of the document file to be initially saved.

In step S15, when an rsidRoot, which is the root identifier, is not present (No), CPU 11 specifies (step S17) identifier information to an rsid attribute of an rsid tag element of the document file. In step S18, CPU 11 saves the document file and terminates the saving processing in FIG. 8.

Figure 9:
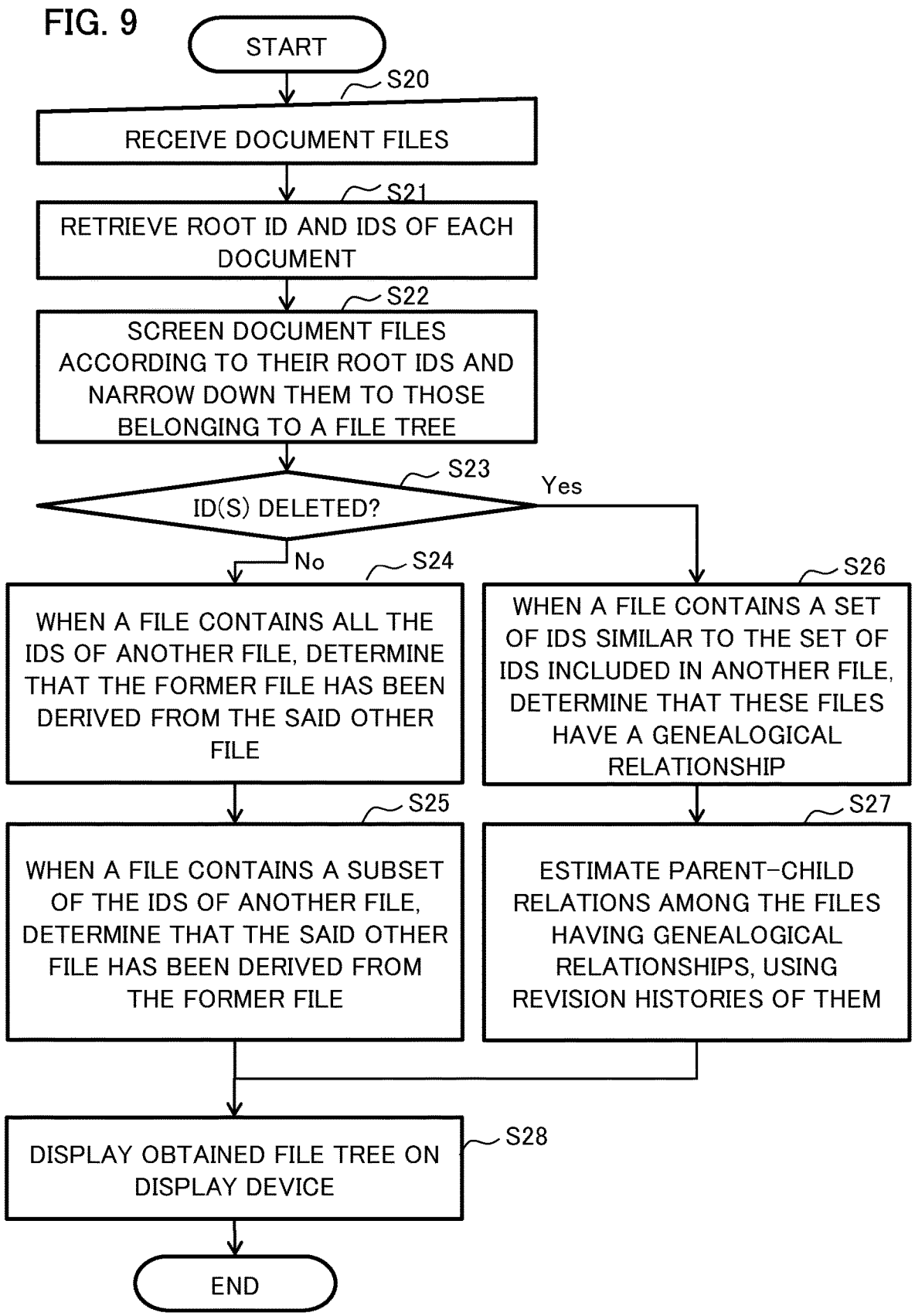
FIG. 9 is a flowchart of process of determining the genealogical relationships of document files according to a first embodiment.

FIG. 9 is a flowchart of the process of determining the genealogical relationships of the document files when Identifier Deletion Determination Section 113 of the first embodiment is present. This determination process is to be performed when CPU 11 executes File Management Program 121.

Reception Section 110 receives (step S20) an input of a plurality of document files and retrieves (step S21) a plurality of identifiers and the root identifier of each document file.

Genealogy Identification Section 111 screens the plurality of document files according to their root identifiers, and narrows down (step S22) the document files to those belonging to a certain file tree. In other words, Genealogy Identification Section 111 reduces the number of the plurality of document files to be considered based on their root identifiers. Note that the purpose of screening and narrowing down the document files according to their root identifiers is to improve the efficiency. Genealogy Identification Section 111 may be configured not to perform narrowing down according to the root identifiers. When a root identifier is not present, Genealogy Identification Section 111 may perform narrowing down based on existing identifiers or may not perform narrowing down.

Identifier Deletion Determination Section 113 determines (step S23) whether identifier(s) have been deleted from the document files. When no identifier has been deleted from the document files (No), Identifier Deletion Determination Section 113 proceeds to step S24. When identifier(s) have been deleted from the document files (Yes), Identifier Deletion Determination Section 113 proceeds to step S26. Note that, for example, in a case where the identifiers are guaranteed not to be deleted, the embodiment may be embodied without including Identifier Deletion Determination Section 113.

In step S24, Genealogy Identification Section 111 determines that when a file contains all the identifiers of the set of identifiers included in another file, the former file has been derived from the said other file. In addition, in step S25, Genealogy Identification Section 111 determines that when a file contains a subset of the set of identifiers included in another file, the said latter file has been derived from the former file, and proceeds to step S28. In steps S24 and S25, Genealogy Identification Section 111 identifies which document file has been derived from which other document file based on the inclusion relationships among the sets of identifiers included in the files. Genealogy Identification Section 111 determines whether the set of identifiers included in a first file is included in the set of identifiers included in a second file.

In step S26, Genealogy Identification Section 111 determines that when a file contains a set of identifiers that is similar to the set of identifiers included in another file, those files have a genealogical relationship. Then, Genealogy Identification Section 111 estimates (step S27) the parent-child relationships of the files having the genealogical relationship, using the revision histories of the files, and proceeds to step S28. The method for determining the parent-child relationships of files is not limited to that using the revision histories of the files, but may be one that uses the date and time when the files are added to the operating system or may be one that uses the names of the files. The processing of step S27 is optional and may be not performed.

In step S28, Display Control Section 112 displays certain file tree(s) on Display Device 16, and then terminates the processing in FIG. 9. The display of a file tree will be described below with reference to FIG. 11.

As described above, the file management program of the embodiment according the present invention causes the computer to perform steps including: receiving a plurality of document files each having a structure such that the document file has been added to with a unique identifier each time the document file has been saved by Editor Program 122 and has a set of identifiers based on the added identifiers and such that one or more identifiers in the set of identifiers may have been deleted after it had been previously added to the document file; determining whether one or more identifiers in the set of identifiers have been deleted; identifying, based on similarities among the sets of identifiers of the document files, a plurality of document files having genealogical relationships; and identifying parent-child relationships of the plurality of document files having genealogical relationships. This makes it possible to determine the genealogical relationships among the files easily.

The file management program causes the computer to perform steps of: receiving a plurality of document files each of which has been added to with a unique identifier each time the document file has been saved by Editor Program 122 and has a set of identifiers based on the added identifiers; and identifying, based on inclusion relationships among the sets of identifiers of the plurality of document files, which document file has been derived from which other document file. This makes it possible to determine the genealogical relationships among the files easily.

Figure 10:
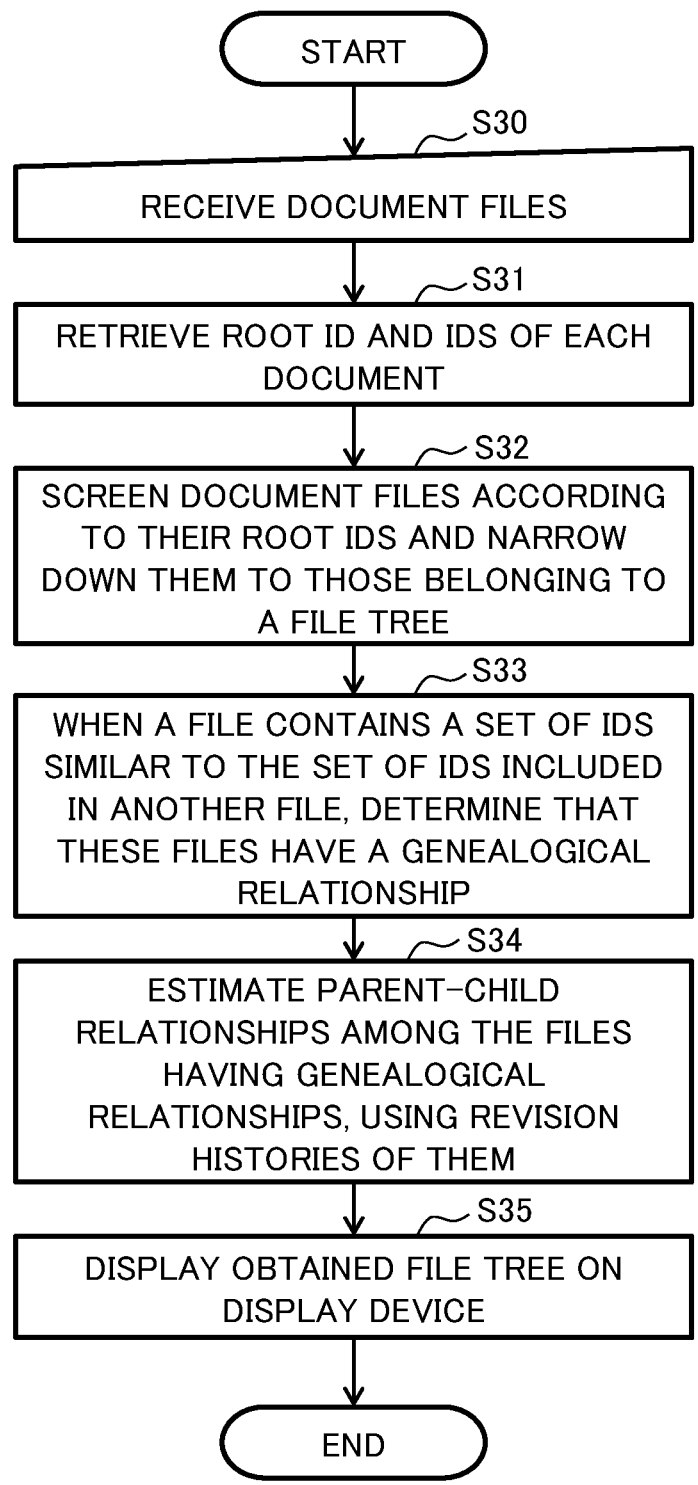
FIG. 10 is a flowchart of process of determining the genealogical relationships of document files according to a second embodiment.

FIG. 10 is a flowchart of the process of determining the genealogical relationships among the document files according to a second embodiment. This determination process is to be performed when CPU 11 executes File Management Program 121 in a case where Identifier Deletion Determination Section 113 is not present.

Reception Section 110 receives (step S30) an input of a plurality of document files and retrieves (step S31) a plurality of identifiers and a root identifier of each document file.

Genealogy Identification Section 111 screens the plurality of document files according to their root identifiers, and narrows down (step S32) the document files to those belonging to a certain file tree. Note that the purpose of the screening and narrowing down is to improve the efficiency. This step may be omitted.

In step S33, Genealogy Identification Section 111 determines that a document file containing a set of identifiers that is similar to the set of identifiers included in another document file has a genealogical relationship with the said other document file. Genealogy Identification Section 111 estimates (step S34) parent-child relationships among the plurality of document files, using revision histories of document files having genealogical relationships. Note that the method for determining the parent-child relationships among the plurality of document files is not limited to that using the revision histories of the document files, but may be one that uses at least one of date and time at which each of the document files are added to the operating system installed on Computer 1 or may be one that uses the names of the document files. The processing of step S34 is optional and may be not performed.

In step S35, Display Control Section 112 displays certain file tree(s) on Display Device 16, and then terminates the processing in FIG. 10. The display of a file tree will be described below in detail with reference to FIG. 11.

As described above, the file management program of the embodiment according the present invention causes the computer to perform steps of: receiving a plurality of document files each of which has been added to with a unique identifier each time the document file has been saved by Editor Program 122 and has a set of identifiers based on the added identifiers; and identifying, based on similarities among the sets of identifiers included respectively in the document files, a plurality of document files having genealogical relationships; and identifying parent-child relationships of the plurality of document files having genealogical relationships. This makes it possible to determine the genealogical relationships among the files easily.

Figure 11:
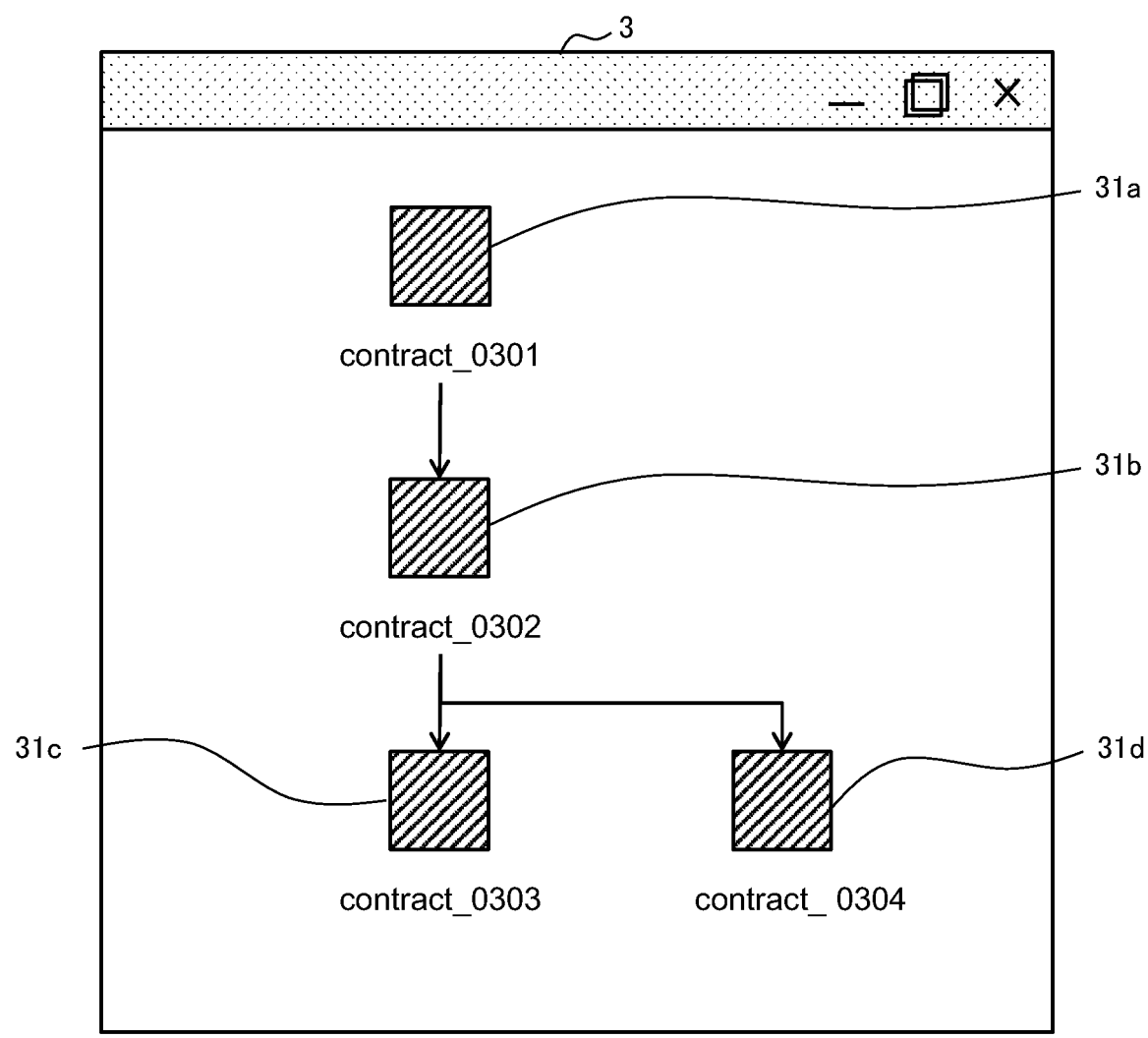
FIG. 11 illustrates a genealogy window for document files.

FIG. 11 illustrates a Genealogy Window 3.

Genealogy Window 3 is a window where a certain file tree is displayed and is displayed on Display Device 16. Genealogy Window 3 shows Document File Icons 31a to 31d in a tree-view.

Document File Icon 31a is an icon which represents Document File 2a in FIG. 3 and under which a file name "contract_0301" is displayed. Document File Icon 31b is an icon which represents Document File 2b in FIG. 3 and under which a file name "contract_0302" is displayed. Document File Icon 31c is an icon which represents Document File 2c in FIG. 3 and under which a file name "contract_0303" is displayed. Document File Icon 31d is an icon which represents Document File 2d in FIG. 3 and under which a file name "contract_0304" is displayed.

An arrow is drawn from Document File Icon 31a toward Document File Icon 31b. This arrow represents that Document File 2b, represented by Document File Icon 31b, has been derived from Document File 2a, represented by Document File Icon 31a.

Further, arrows are drawn from Document File Icon 31b toward Document File Icons 31c and 31d. These arrows represent that Document Files 2c and 2d, respectively represented by Document File Icons 31c and 31d, have been derived from Document File 2b, represented by Document File Icon 31b.

Modification

The present invention is not limited to the embodiment described above and may be modified within the range not departing from the gist of the present invention. Non-limiting examples of the modification include the following (a) to (f):

(a) Genealogy of files may be presented in a view other than the tree view.

(b) The identifiers of a document file should be unique, but need not be random.

(c) The root identifier of a document file is not mandatory. At least unique identifier is assigned to the file when the file is saved.

(d) Document files having a genealogical relationship may be identified based on either or both of an inclusion relationship among the sets of identifiers of the document files and a similarity among the sets of identifiers of the document files.

(e) The use of the identifier deletion determination section is optional. A certain embodiment may be embodied without including the identifier deletion determination section.

(f) The feature of narrowing down document files according to their root identifiers is optional. A certain embodiment may be embodied without implementing the feature of narrowing down document files according to their root identifiers.

What is claimed is:

1. A non-transitory computer readable medium including a file genealogy identification program, the file genealogy identification program configured to cause at least one computer to perform operations, the operations comprising:

tagging computer generated program files characterized by an extended markup language (XML) format with computer generated unique rsids tag elements, the computer generated unique rsids tag elements comprising a unique rsids root identifier tag element, a unique rsids value attribute identifier tag element, and a unique program file type identifier;

parsing the computer generated unique rsids tag elements for an intersection and a union between a first set of computer generated unique rsids tag elements derived from a first computer generated program file in a plurality of the computer generated program files and a second set of computer generated unique rsids tag elements derived from a second computer generated program file in the plurality of the computer generated program files, wherein the intersection and the union denote a similarity between the first set of computer generated unique rsids tag elements and the second set of computer generated unique rsids tag elements based on a number of the computer generated unique rsids tag elements in the intersection, a number of the computer generated unique rsids tag elements in the union, and a divisible relationship between the number in the intersection and the number in the union; and producing a computer generated genealogical relationship result between the first computer generated program file and the second computer generated program file based on the similarity.

2. A non-transitory computer readable medium with including a file genealogy identification program, the file genealogy identification program configured to cause at least one computer to perform operations, the operations comprising:

tagging computer generated program files characterized by an extended markup language (XML) format with computer generated unique rsids tag elements, the computer generated unique rsids tag elements comprising a unique rsids root identifier tag element, a unique rsids value attribute identifier tag element, and a unique program file type identifier;

parsing the computer generated unique rsids tag elements for an intersection and a union between a first set of computer generated unique rsids tag elements derived from a first computer generated program file in a plurality of the computer generated program files and a second set of computer generated unique rsids tag elements derived from a second computer generated program file in the plurality of the computer generated program files, wherein the intersection and the union denote a first similarity between the first set of computer generated unique rsids tag elements and the second set of computer generated unique rsids tag elements based on a number of the computer generated unique rsids tag elements in the intersection and a number of the computer generated unique tag elements in the union and a divisible relationship between the number in the intersection and the number in the union;

parsing, via a genetic algorithm, of text strings comprising a first text string in the first computer generated program file and a second text string in the second computer generated program file, resulting in a genetic alignment between the first text string and the second text string indicative of a second similarity; and producing a computer generated genealogical relationship result based on the first similarity and the second similarity.

3. The non-transitory computer readable medium according to claim 1, wherein the plurality of computer generated program files is a first plurality of computer generated program files, wherein the file genealogy identification program further causes the at least one computer to further perform steps of:

identifying a second plurality of computer generated program files having genealogical relationships based on a result of applying the step of determining the genealogical relationship to each possible combination of first and second computer generated program files in the first plurality of computer generated program files; and identifying parent-child relationships of the computer generated program files in the second plurality of computer generated program files using information of at least one of date and time of each computer generated program file in the second plurality of computer generated program files.

4. The non-transitory computer readable medium according to claim 1, wherein the plurality of computer generated program files is a first plurality of computer generated program files, wherein the file genealogy identification program further causes the at least one computer to further perform steps of:

identifying a second plurality of computer generated program files having genealogical relationships based on a result of applying the step of determining the genealogical relationship to each possible combination of first and second computer generated program files in the first plurality of computer generated program files; and identifying parent-child relationships of the computer generated program files in the second plurality of computer generated program files using information of a file name of each computer generated program file in the second plurality of computer generated program files.

5. The non-transitory computer readable medium according to claim 1, wherein the file genealogy identification program further causes the at least one computer to further perform a step of displaying, on a display device, a file tree representing genealogical relationships among the plurality of the computer generated program files.

6. The non-transitory computer readable medium according to claim 2, wherein the file genealogy identification program further causes the at least one computer to further perform a step of displaying, on a display device, a file tree representing genealogical relationships among the plurality of the computer generated program files.

7. The non-transitory computer readable medium according to claim 3, wherein the file genealogy identification program further causes the at least one computer to further perform a step of displaying, on a display device, a file tree representing genealogical relationships among the plurality of the computer generated program files.

8. The non-transitory computer readable medium according to claim 4, wherein the file genealogy identification program further causes the at least one computer to further perform a step of displaying, on a display device, a file tree representing genealogical relationships among the plurality of the computer generated program files.

9. The non-transitory computer readable medium according to claim 1, wherein the file genealogy identification program further causes the at least one computer to further perform a step of reducing a number of the plurality of computer generated program files to be considered based on the unique rsids root identifier tag element included in each of the plurality of computer generated program files, the unique rsids root identifier tag element being one of the unique rsid tag elements added to the corresponding computer generated program file when the corresponding computer generated program file is initially saved.

10. The non-transitory computer readable medium according to claim 2, wherein the file genealogy identification program further causes the at least one computer to further perform a step of reducing a number of the plurality of computer generated program files to be considered based on the unique rsids root identifier tag element included in each of the plurality of computer generated program files, the unique rsids root identifier tag element being one of the unique rsid tag elements added to the corresponding computer generated program file when the corresponding computer generated program file is initially saved.

11. The non-transitory computer readable medium according to claim 3, wherein the file genealogy identification program further causes the at least one computer to further perform a step of reducing a number of the plurality of computer generated program files to be considered based on the unique rsids root identifier tag element included in each of the plurality of computer generated program files, the unique rsids root identifier tag element being one of the unique rsid tag elements identifier added to the corresponding computer generated program file when the corresponding computer generated program file is initially saved.

12. The non-transitory computer readable medium according to claim 4, wherein the file genealogy identification program further causes the at least one computer to further perform a step of reducing a number of the plurality of computer generated program files to be considered based on the unique rsids root identifier tag element included in each of the plurality of computer generated program files, the unique rsids root identifier tag element being one of the unique rsids tag elements added to the corresponding computer generated program file when the corresponding computer generated program file is initially saved.

13. A non-transitory computer readable medium including a file genealogy identification program, the file genealogy identification program configured to cause at least one computer to perform operations, the operations comprising:
tagging computer generated program files characterized by an extended markup language (XML) format with computer generated unique rsids tag elements, the computer generated unique rsids tag elements comprising a unique rsids root identifier tag element, a unique rsids value attribute identifier tag element, and a unique program file type identifier;
first parsing the computer generated unique rsids tag elements for a deletion of at least one computer generated unique rsids tag element of a first set of computer generated unique rsids tag elements derived from a first computer generated program file in a plurality of the computer generated program files or a second set of computer generated unique rsids tag elements derived from a second computer generated program file in the plurality of the computer generated program files,
wherein the first parsing comprises a revision history parsing based on a trustworthiness metric whereby the computer generated unique rsids tag elements associated with real-time revisions denote being trustworthy;
second parsing the computer generated unique rsids tag elements for an intersection and a union between the first set of computer generated unique rsids tag elements and the second set of computer generated unique rsids tag elements,
wherein the intersection and the union denote a similarity between the first set of computer generated unique rsids tag elements and the second set of computer generated unique rsids tag elements based on a number of the computer generated unique rsids tag elements in the intersection, a number of the computer generated unique rsids tag elements in the union, and a divisible relationship between the number in the intersection and the number in the union;
generating a computer generated parent-child genealogical relationship based on the similarity upon an indication that the at least one of the computer generated unique rsids tag elements in the plurality of the computer generated files has been deleted;
generating a derived computer generated program file based on the first parsing comprising the revision history parsing upon an indication that the at least one of the computer generated unique rsids tag elements in the plurality of the computer generated files has not been deleted, wherein the derived computer generated program file is derived from at least one of the first computer generated program file or the second computer generated program file; and
providing a result comprising at least one of the computer generated parent-child genealogical relationship or the derived computer generated program file.

14. A file genealogy identification system implemented using at least one computer including one or more hardware processors, the file genealogy identification system comprising:
the system configured to tag computer generated program files characterized by an extended markup language (XML) format with computer generated unique rsids tag elements, the computer generated unique rsids tag elements comprising a unique rsids root identifier tag element, a unique rsids value attribute identifier tag element, and a unique program file type identifier;
a reception section, implemented using at least one of the one or more hardware processors, configured to receive a plurality of the tagged computer generated program files characterized by the XML format with the computer generated unique rsids tag elements;
an identifier deletion determination section, implemented using at least one of the one or more hardware processors, configured to first parse the computer generated unique rsids tag elements for a deletion of at least one computer generated unique rsids tag element of a first set of computer generated unique rsids tag elements derived from a first computer generated program file in a plurality of the computer generated program files or a second set of computer generated unique rsids tag elements derived from a second computer generated program file in the plurality of the computer generated program files, wherein the first parsing comprises a revision history parsing based on a trustworthiness metric whereby the computer generated unique rsids tag elements associated with real-time revisions denote being trustworthy; and a genealogy identification section, implemented using at least one of the one or more hardware processors, configured to:

second parse the computer generated unique rsids tag elements for an intersection and a union between the first set of computer generated unique rsids tag elements and the second set of computer generated unique rsids tag elements, wherein the intersection and the union denote a similarity between the first set of computer generated unique rsids tag elements and the second set of computer generated unique rsids tag elements based on a number of the computer generated unique rsids tag elements in the intersection, a number of the computer generated unique rsids tag elements in the union, and a divisible relationship between the number in the intersection and the number in the union;

generate a computer generated parent-child genealogical relationship based on the similarity upon an indication that the at least one of the computer generated unique rsids tag elements in the plurality of the computer generated files has been deleted;

generate a derived computer generated program file based on the first parsing comprising the revision history parsing upon an indication that the at least one of the computer generated unique rsids tag elements in the plurality of the computer generated files has not been deleted, wherein the derived computer generated program file is derived from at least one of the first computer generated program file or the second computer generated program file; and provide a result comprising at least one of the computer generated parent-child genealogical relationship or the derived computer generated program file to a display control section.

15. A file genealogy identification system implemented using at least one computer including one or more hardware processors, the file genealogy identification system comprising:

the system configured to tag computer generated program files characterized by an extended markup language (XML) format with computer generated unique rsids tag elements, the computer generated unique rsids tag elements comprising a unique rsids root identifier tag element, a unique rsids value attribute identifier tag element, and a unique program file type identifier;

a reception section, implemented using at least one of the one or more hardware processors, configured to receive a plurality of the tagged computer generated program files characterized by the XML format with the computer generated unique rsids tag elements; and a genealogy identification section, implemented using at least one of the one or more hardware processors, configured to:

parse the computer generated unique rsids tag elements for an intersection and a union between a first set of computer generated unique rsids tag elements derived from a first computer generated program file in a plurality of the computer generated program files and a second set of computer generated unique rsids tag elements derived from a second computer generated program file in the plurality of the computer generated program files, wherein the intersection and the union denote a similarity between the first set of computer generated unique rsids tag elements and the second set of computer generated unique rsids tag elements based on a number of the computer generated unique rsids tag elements in the intersection, a number of the computer generated unique rsids tag elements in the union, and a divisible relationship between the number in the intersection and the number in the union; and producing a computer generated genealogical relationship result between the first computer generated program file and the second computer generated program file based on the similarity.

16. A file genealogy identification system implemented using at least one computer including one or more hardware processors, the file genealogy identification system comprising:

the system configured to tag computer generated program files characterized by an extended markup language (XML) format with computer generated unique rsids tag elements, the computer generated unique rsids tag elements comprising a unique rsids root identifier tag element, a unique rsids value attribute identifier tag element, and a unique program file type identifier;

a reception section, implemented using at least one of the one or more hardware processors, configured to receive a plurality of the tagged computer generated program files characterized by the XML format with the computer generated unique rsids tag elements; and a genealogy identification section, implemented using at least one of the one or more hardware processors, configured to;

parsing the computer generated unique rsids tag elements for an intersection and a union between a first set of computer generated unique rsids tag elements derived from a first computer generated program file in a plurality of the computer generated program files and a second set of computer generated unique rsids tag elements derived from a second computer generated program file in the plurality of the computer generated program files, wherein the intersection and the union denote a first similarity between the first set of computer generated unique rsids tag elements and the second set of computer generated unique rsids tag elements based on a number of the computer generated unique rsids tag elements in the intersection and a number of the computer generated unique rsids tag elements in the union, and a divisible relationship between the number in the intersection and the number in the union;

parsing, via a genetic algorithm, of text strings comprising a first text string in the first computer generated program file and a second text string in the second computer generated program file, resulting in a genetic alignment between the first text string and the second text string indicative of a second similarity; and producing a computer generated genealogical relationship result based on the first similarity and the second similarity.

* * * * *